No. 718,462. PATENTED JAN. 13, 1903.
F. C. IELFIELD.
CORN HUSKING MACHINE.
APPLICATION FILED APR. 21, 1902.
NO MODEL. 4 SHEETS—SHEET 1.

Witnesses:
Louis W. Gratz
Emma M. Graham

Fred C. Ielfield
Inventor
By Geyer & Popp
Attorneys.

No. 718,462. PATENTED JAN. 13, 1903.
F. C. IELFIELD.
CORN HUSKING MACHINE.
APPLICATION FILED APR. 21, 1902.
NO MODEL. 4 SHEETS—SHEET 2.

Witnesses:
Louis W. Gratz.
Emma M. Graham.

Fred C. Ielfield, Inventor
By Geyer & Popp
Attorneys

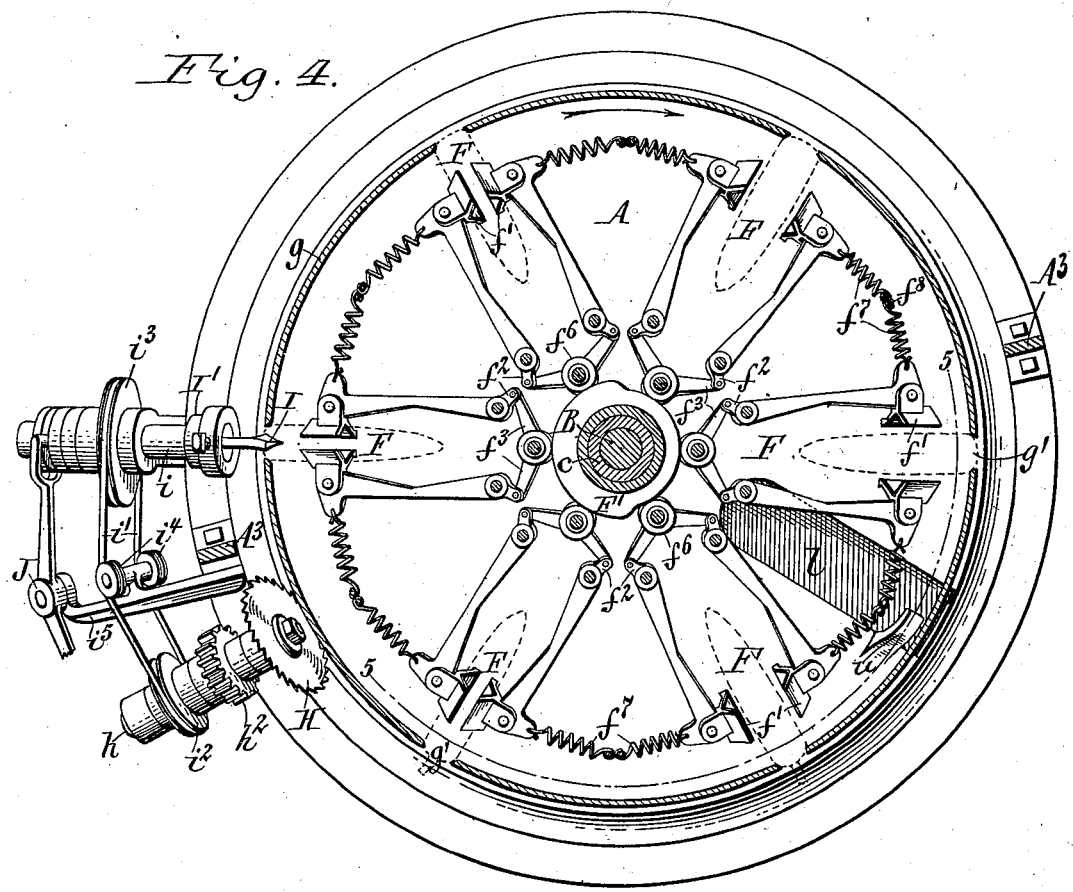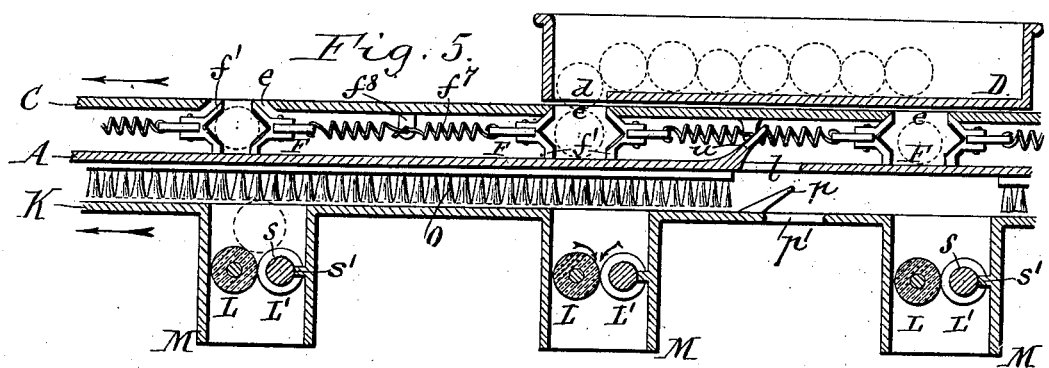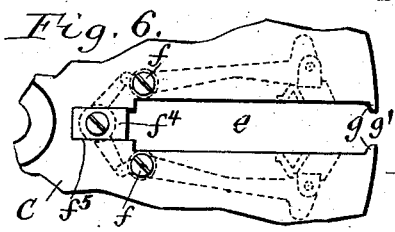

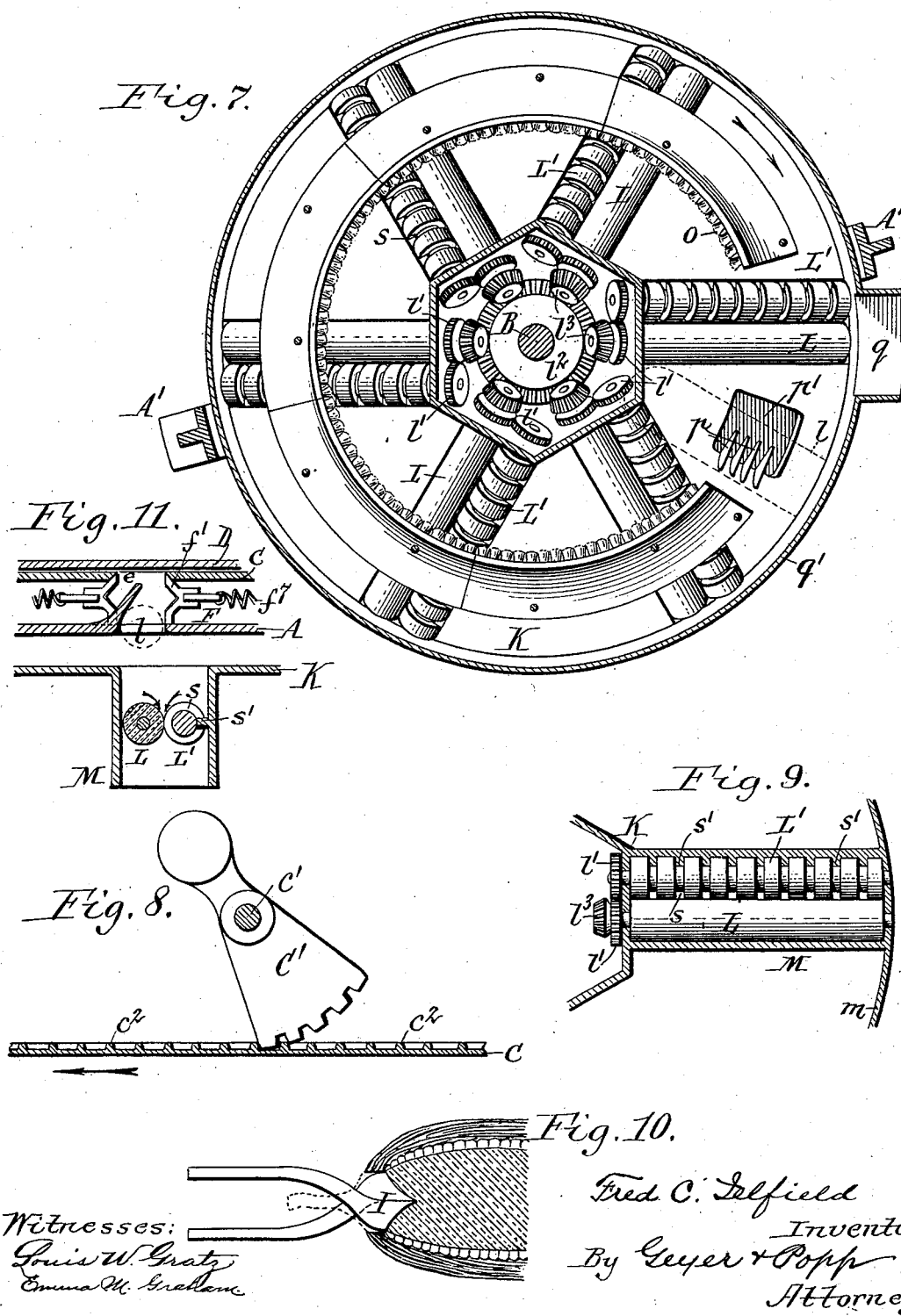

UNITED STATES PATENT OFFICE.

FRED C. IELFIELD, OF SILVERCREEK, NEW YORK.

CORN-HUSKING MACHINE.

SPECIFICATION forming part of Letters Patent No. 718,462, dated January 13, 1903.

Application filed April 21, 1902. Serial No. 103,976. (No model.)

*To all whom it may concern:*

Be it known that I, FRED C. IELFIELD, a citizen of the United States, residing at Silvercreek, in the county of Chautauqua and State of New York, have invented new and useful Improvements in Corn-Husking Machines, of which the following is a specification.

This invention relates to a machine for husking green corn.

The principal object of my invention is the production of a machine in which the ears of corn are operated upon individually by the husking devices without interference of other ears for insuring the thorough and complete removal of the husks and which at the same time combines the advantages of compactness and a comparatively large capacity.

My invention has the further objects to improve the husking devices with a view of insuring a positive seizure of the husks by the same; to provide efficient means for turning the ears while under the action of the husking devices so as to present all sides thereof to the same, and to effect the discharge of the husked ears and the husks from the machine by simple means.

Briefly stated, my improved machine comprises, essentially, a head having an intermittent rotary or advancing motion and carrying on its under side a series of holders or grippers, which successively receive the ears to be husked, a rotary cutter past which the grippers carry the ears and which is arranged to sever the stubs from the ears, a boring-tool arranged beyond the cutter and which bores a hole centrally in the butt of the ears as they are arrested opposite the same for severing the husks at their junction with the cob, and husking-rollers which are arranged underneath each gripper and receive the bored ears therefrom. The several pairs of husking-rollers are carried by a second rotary head or frame arranged underneath the gripper-carrying head and turning intermittently in unison therewith, while the husking-rollers themselves are driven to turn continuously.

Figure 1:
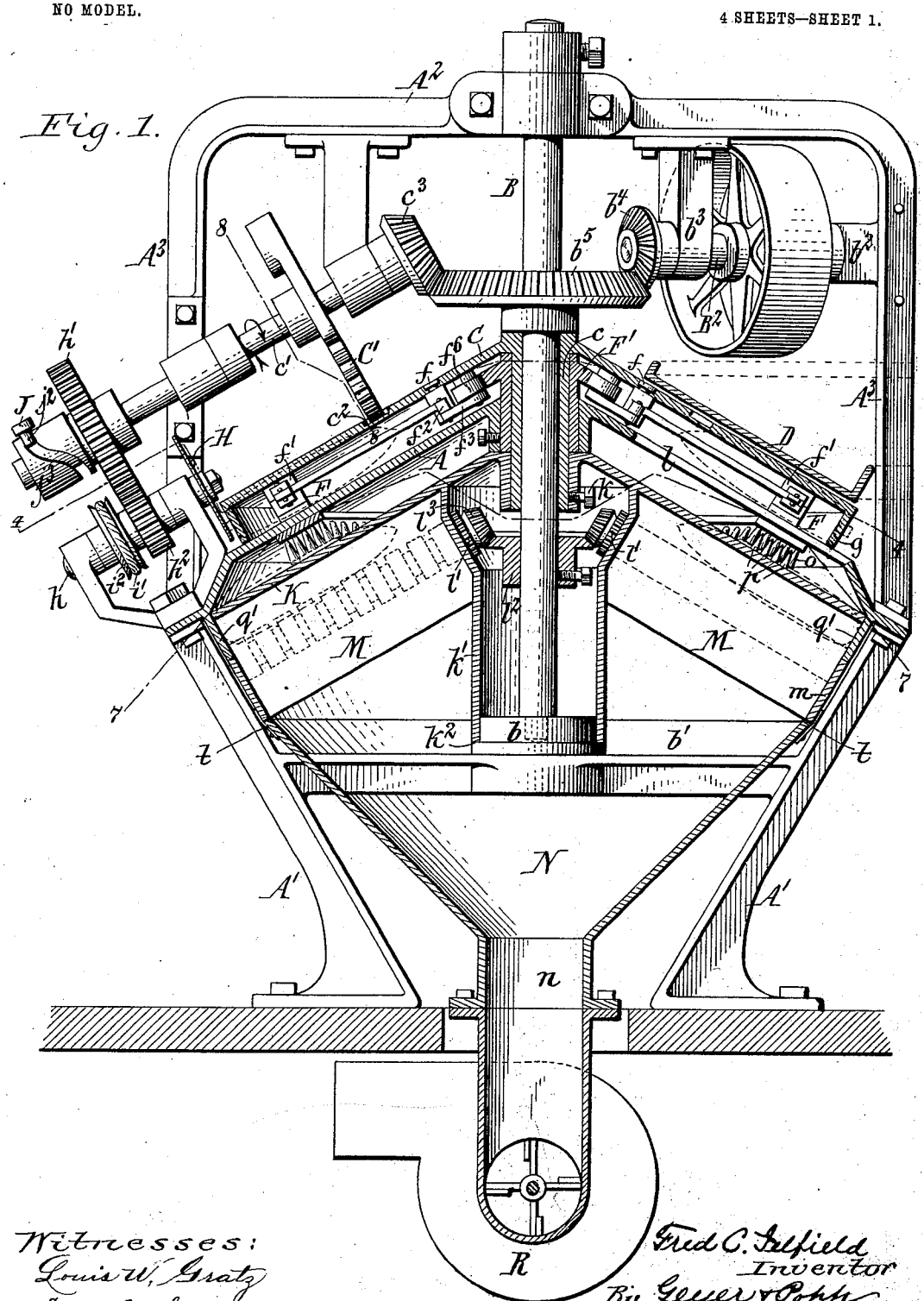
Figure 2:
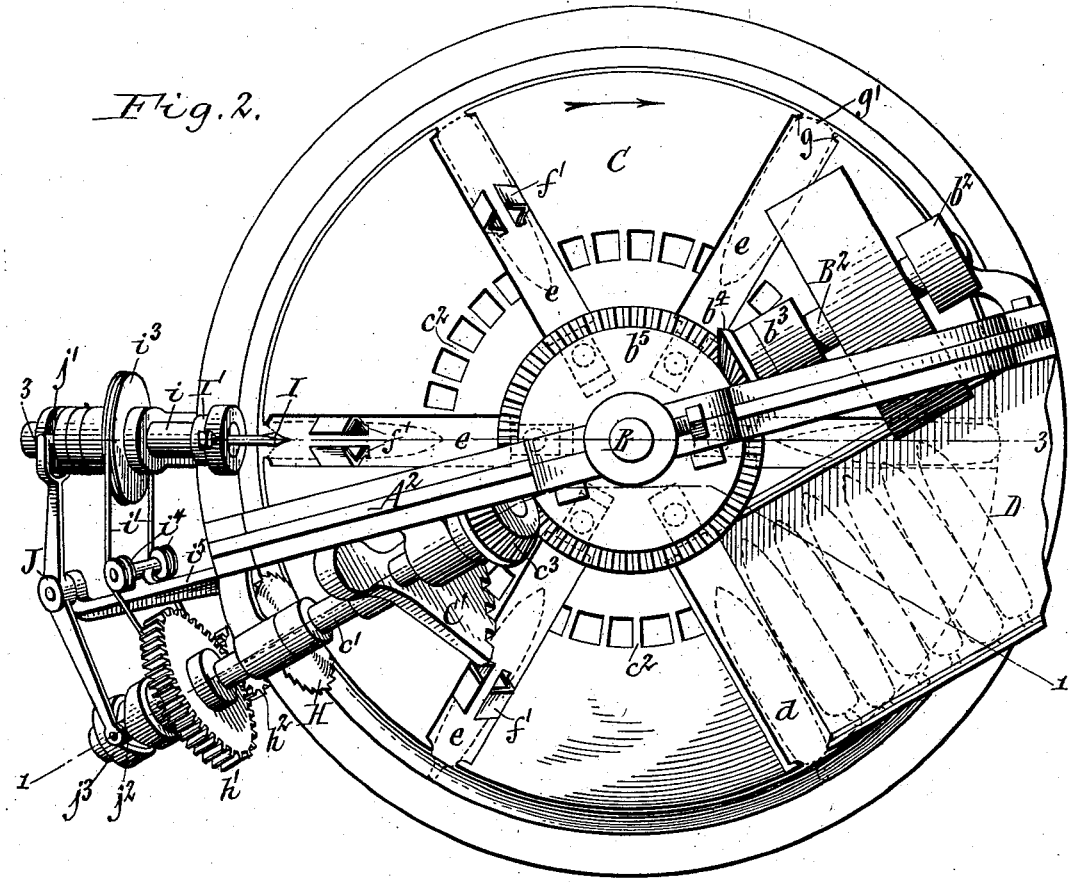
Figure 3:
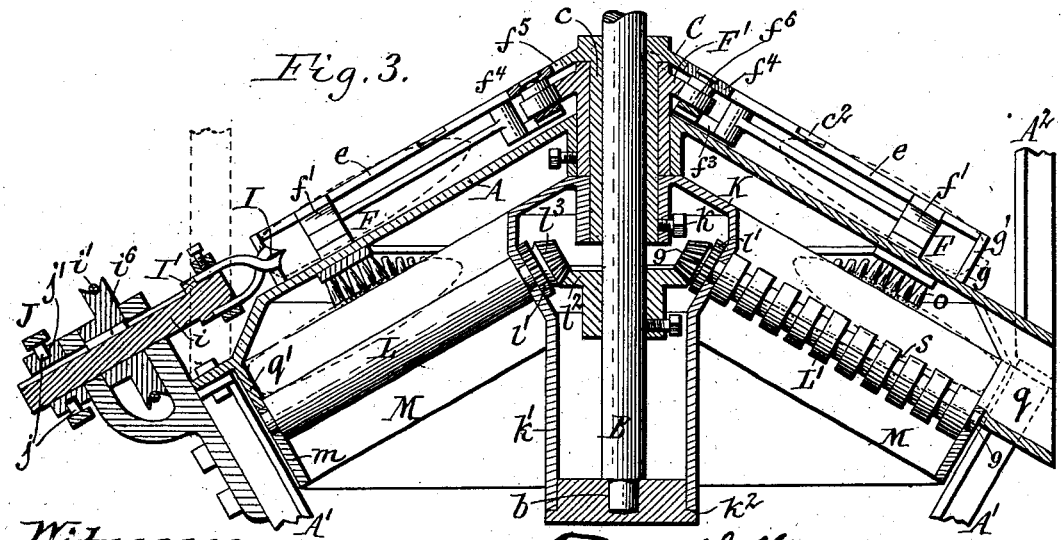

In the accompanying drawings, consisting of four sheets, Figure 1 is a vertical section of my improved machine in line 1 1, Fig. 2. Fig. 2 is a top plan view thereof, a portion of the feed box or table being broken away. Fig. 3 is a vertical section of the upper portion of the machine in line 3 3, Fig. 2. Fig. 4 is a substantially horizontal section in line 4 4, Fig. 1. Fig. 5 is a vertical section in line 5 5, Fig. 4. Fig. 6 is a fragmentary top plan view of the upper rotary head or deck of the machine, showing one of the feed-openings through which the ears are delivered to the traveling grippers below. Fig. 7 is a substantially horizontal section in line 7 7, Fig. 1. Fig. 8 is a transverse section in line 8 8, Fig. 1. Fig. 9 is a substantially horizontal section in line 9 9, Fig. 3, showing a pair of the husking-rollers. Fig. 10 is a fragmentary longitudinal section of an ear of corn, illustrating the action of the boring-tool. Fig. 11 is a fragmentary view similar to Fig. 5, showing the position of the parts while delivering an ear from one of the grippers to the corresponding pair of husking-rollers.

Like letters of reference refer to like parts in the several figures.

The stationary frame of the machine preferably consists of a conical plate or table A, supported at its edge by a pair of inclined legs or side frames A' and a yoke $A^2$, extending diametrically across the upper side of said table and having its upright side members $A^3$ bolted to a marginal flange of the table, as shown in Fig. 1.

B indicates an upright driving-shaft arranged centrally in the machine and journaled at its upper end in a bearing on the yoke $A^2$ and at its lower end in a step-bearing $b$, carried by a bridge-piece $b'$, connecting the side frames A'.

$B^2$ indicates the main driving-shaft, arranged horizontally at one side of the upright shaft B and journaled in a bracket $b^2$ and a hanger $b^3$, carried by the yoke $A^2$. Motion is transmitted from the main shaft to the upright shaft B by bevel-gears $b^4$ $b^5$.

C indicates an intermittently-rotating head, deck, or carrier, preferably of conical form, arranged above the stationary table A, concentrically with the shaft B, and provided with a depending hub $c$, which turns on said shaft. An intermittent rotary movement is imparted to the head C by any suitable mechanism; but I prefer to employ that shown in the drawings, consisting of a gear-segment C', secured to a continuously-rotating shaft $c'$ and meshing once during every turn of this shaft with an annular row of gear-teeth $c^2$ on the upper side of the head. The shaft $c'$ is inclined parallel with the sloping top of the head C and journaled in bearings carried by the yoke $A^2$. It is continuously driven in one direction by a bevel-pinion $c^3$, secured to its inner end and meshing with the bevel-gear $b^5$ on the driving-shaft B.

Immediately above the rotary head C and on one side of the driving-shaft B a feed-box D is arranged, into which the ears to be husked are placed crosswise with their butts toward the periphery of the rotary head. This box is provided at its inner or delivery end with a discharge-opening $d$, which is arranged radially of the head C and made of the proper size to permit but a single ear to pass through it at a time. To avoid interference of the gear-teeth $c^2$ of the rotary head C with the bottom of the feed-box, these teeth are countersunk, as shown in Figs. 1 and 8. The head C is provided with a number of equidistant radial apertures $e$, adapted to register successively with the discharge-opening of the feed-box D and made of substantially the same size as said discharge-opening to allow the ears of corn to drop through the same, as shown by dotted lines in Fig. 5. Underneath each of the apertures of the head C is arranged a traveling holder or gripper F, adapted to receive and grasp an ear of corn and carry it past the cutting and boring appliances hereinafter described. These grippers are carried by the rotary head C and arranged radially and equidistant on its under side. Each consists of a pair of arms pivoted at their inner ends to the head C by pins $f$ and provided at their outer ends with V-shaped jaws $f'$, between which the ears are firmly seized, as shown by dotted lines in Figs. 2 and 4, these jaws being preferably faced with rubber or similar soft material to avoid bruising the corn. The V-shaped form of the jaws insures the centering of the ears in the grippers. The jaws are automatically opened and closed at the proper times by any suitable mechanism; but the devices preferably employed for this purpose consist of short arms $f^2$, extending inwardly from the hubs of the gripper-arms and connected by toggle-links $f^3$ with a sliding block $f^4$, Figs. 4 and 6. The several blocks $f^4$ slide in radial guideways $f^5$ in the head C, and the reciprocation of the blocks causes the toggle-links $f^3$ to be alternately deflected and straightened, opening and closing the jaws of the grippers accordingly. The blocks are automatically moved outward for closing the grippers by a stationary cam F', which surrounds the hub C and is secured to the table A and over the face of which ride antifriction-rollers $f^6$, journaled on the sliding blocks $f^4$. The gripper-jaws are opened by springs $f^7$, attached at one end to the gripper-arms and at their other ends to lugs $f^8$, depending from the under side of the rotary head C, the ends of adjacent springs being fastened to the same lug to simplify the attachments. By this mechanism when the rollers $f^6$ of the traveling grippers run over the high face of the cam F' the sliding blocks $f^4$ are moved outward, causing the grippers to be closed and to remain in that position until the rollers come in contact with the low face of the cam, when the blocks are caused to recede and the gripper opened by the reaction of the springs $f^7$. The gripper-arms are preferably so constructed as to have a certain amount of elasticity to enable the same to adapt themselves to ears of different diameters.

As shown in Figs. 1 and 3, the rotary head C is provided at its edge with a depending stop-flange or gage-rail $g$, which closely approaches the upper surface of the inclined table A and prevents the ears dropped through the apertures $e$ of said rotary head from sliding off said table. This gage-rail is provided opposite the jaws of each gripper F with an opening $g'$, large enough to allow the stub of the ear held in the gripper to pass through it, but so small that the butt protrudes as little as possible beyond the rail.

H indicates a cutter, preferably a small circular saw, arranged in close proximity to the outer side of the gage-rail $g$ and beyond the feed-box D, so as to sever the protruding stubs from the ears as they are carried past the saw by the traveling grippers. The saw is secured to the inner end of an inclined shaft $h$, journaled in bearings carried by the stationary frame of the machine and driven from the shaft $c'$ above the same by gear-wheels $h'$ $h^2$, Figs. 1 and 2.

At a suitable distance beyond the saw H a boring tool or bit I is arranged, which is adapted to bore a hole centrally in the butt-ends of the ears as they successively come to a standstill opposite the bit, as shown in Fig. 10, the purpose of this operation being to sever all of the husks where they join the cob for completely detaching them at this point, while at the same time cutting away little or none of the kernels of corn. The head of the bit is of the proper diameter to sever the husks of comparatively large ears and yet not cut away many kernels from small ears. As shown in Figs. 2, 3, and 4, the bit is clamped to a rotary head I', carried by an inclined shaft $i$, journaled in bearings supported on the stationary frame of the machine. This shaft is driven from the saw-shaft by a belt $i'$, running around ground-pulleys $i^2$ $i^3$, mounted on these shafts and over idler-pulleys $i^4$, journaled on a bracket $i^5$ of the stationary frame. The bit-shaft I is free to slide lengthwise in its bearings to permit the bit to advance into the butts of the ears and recede therefrom for clearing the rotary head C, and for this purpose said shaft is splined to its driving-pulley $i^3$, as shown at $i^6$ in Fig. 3. The bit is automatically advanced and retracted by a rock-lever J, mounted on the bracket $i^5$ of the frame and having one of its arms forked and provided with pins $j$, which engage with an annularly-grooved shifting collar $j'$, secured to the bit-shaft $i$. The other arm of the rock-lever is provided with an antifriction-roller $j^2$, which engages in the groove of a rotary actuating-cam $j^3$, secured to the upper inclined shaft $c'$.

The reciprocating movement of the bit and the intermittent rotary movement of the gripper-carrying head C are relatively so timed that the bit advances immediately after an ear of corn comes to a standstill opposite the same and recedes clear of the rotary head before the latter advances another step for bringing the next succeeding ear opposite the bit.

K indicates a second rotary head or plate, preferably of conical form, arranged a short distance below the stationary table A and secured centrally to the hub $c$ of the upper rotary head C by a set-screw $k$ or other means, so as to be turned intermittently in unison with said head. This lower head is preferably provided centrally with a depending hub or sleeve $k'$, which surrounds the upright shaft B and rests upon an annular shoulder $k^2$ of the step-bearing $b$, the reduced upper portion of this bearing being cylindrical and fitting into the lower end of this sleeve, as seen in Fig. 1. The lower rotary head K carries the husking devices, which preferably consist of as many pairs of rollers L' as there are ear holders or grippers F. A pair of such husking-rollers is arranged radially under each gripper, and the stationary table A is provided with a radial aperture $l$ for the passage of the sawed and bored ears, so that when a gripper and its companion husking-rollers, which advance in unison therewith, come into register with said aperture the ear which is released by the grippers at that time will drop through the aperture and upon the husking-rollers. In order to open the grippers at the proper time, the low face of the cam F' is arranged on the same side of the machine as the discharge-aperture $l$, and said face preferably begins a short distance in advance of said aperture to permit the opening of the jaws a short time before they arrive at the aperture, the released ear being loosely confined between the open jaws of the gripper and rolled or slid along the stationary table A by them until it reaches said aperture, when it drops through the same.

In the preferred construction (shown in the drawings) the husking-rollers of each pair are arranged in a radial housing M, depending from the lower rotary head K and located directly underneath the companion gripper F. The husking-rollers are suitably journaled at their ends in the end walls of the housing M, and those of each pair are arranged closely together and driven at a uniform speed with their meeting sides traveling downward in the same direction, so as to seize the husks and strip them from the ears. In the construction shown in the drawings the rollers of each pair are geared together by spur-wheels $l'$, and the several pairs are driven from a common bevel-gear $l^2$, secured to the upright shaft B and meshing with a bevel-pinion $l^3$, carried by one of the rollers of each pair. It will be observed that although the upper and lower rotary heads C and K are driven intermittently the husking-rollers are driven continuously from the shaft B, thus utilizing the full husking capacity of the rollers. One of the rollers of each pair is preferably constructed of rubber or faced with that material to enable the rollers to better grip the husks.

Under the several housings M is arranged a stationary receiving-hopper N for the detached husks passing between the rollers.

In order to present all sides of the ears to the husking-rollers for insuring the complete removal of the husks, an ear-turning bed or surface $o$ is arranged above the several sets of husking-rollers and at the proper distance therefrom to cause the upper sides of the ears resting upon the rollers to bear forcibly against said bed. As the husking-rollers travel with reference to this bed the ears are compelled to turn or roll between the bed and the rollers, thus subjecting them on all sides to the husking action of the rollers. The bed $o$ is made yielding to accommodate ears of different sizes and prevent bruising of the corn, and for this purpose it preferably consists of an annular brush, the bristles of which face the husking-rollers. The brush is secured to the under side of the table A.

To remove any silks that may adhere to the brush $o$, a comb or series of stripping-fingers $p$ is arranged in the path of its bristles. As shown in Figs. 5 and 7, this comb projects from the upper side of the lower rotary head K, and its teeth are inclined in the direction in which they travel with the head and overhang an aperture $p'$, arranged in the head behind the teeth. By this construction the silk stripped from the brush by the fingers is crowded off the rear ends of the fingers by the brush and discharged through the aperture $p'$ into the hopper N.

The husked ears are preferably discharged from the machine by gravity by inclining the husking-rollers toward the periphery of their carrying-head K, so that the ears after being husked slide off the rollers through a discharge-spout $q$, projecting from the edge of the fixed table A, preferably at a point underneath the feed-box. The housings M of the husking-rollers have open bottoms, which communicate with the receiving-hopper N, and their outer ends are closed by an annular wall $m$, which is cut away above the rollers to permit the free discharge of the husked ears when a pair of rollers arrives opposite the discharge-spout $q$. A premature discharge of the ears is prevented by an annular guard rim or curb $q'$, depending from the edge of the fixed table A and overlapping the outer ends of the husking-rollers, as shown in Fig. 1 and 3, this rim extending around the table from one side of the discharge-spout $q$ to the other, as shown in Fig. 7.

For the purpose of causing the husks to be positively drawn between the husking-rollers L L' a suction-current is preferably passed downward between their opposing sides, thus causing the husks to adhere to the faces of the rollers and compelling them to enter between the same. This air-current is induced by an exhaust-fan R, having its eye connected with the delivery-spout $n$ of the discharge-hopper N, so as to exhaust the air from the hopper and the housings M, containing the husking-rollers. One of the rollers of each pair is provided throughout its length with annular grooves $s$ to form a series of air-passages between the rollers, as best shown in Fig. 9, and in order to concentrate the air-current upon these passages the plain roller of each pair is arranged closely to the adjacent wall of the housing M, and the portions of the grooves $s$ at the outer side of the opposing roller are closed by projections or comb-like teeth $s'$, which extend from the adjacent wall of the housing M into the grooves and are fitted therein as nearly air-tight as practicable. The grooved husking-roller of each pair is preferably constructed of metal and the other plain roller of rubber or faced with rubber. The joint between the upper edge of the hopper N and the adjacent lower edge of the annular wall $m$ is closed by an annular flap $t$, of felt or other suitable material, secured to the hopper and overlapping said wall, as shown in Fig. 1. The suction-current also draws the silks between the husking-rollers, thus removing a considerable portion of the same from the ears as well as the husks.

$u$ indicates a stop or guard rising from the table A at the rear edge of the discharge-aperture $l$ and serving to prevent the ears from rolling beyond said aperture.

The hub or sleeve K', while forming a support for the rotary heads C and K, also serves as a guard or housing which keeps the detached husks and silks out of contact with the driving-gearing of the husking-rollers.

As shown in Fig. 7, the ear-turning brush $o$ preferably begins adjacent to the front side of the delivery or transfer aperture $l$ of the table and terminates adjacent to the front side of the discharge-spout $q$, so that the brush does not interfere with the delivery of the ears from the ear-grippers to the husking-rollers nor with the discharge of the ears from said rollers.

In order to enable the jaws $f'$ of the ear-grippers to bear evenly against the sides of the ears, they are pivoted or swiveled to the gripper-arms, as shown in Fig. 4.

The operation of the machine is as follows: The machine being set in motion, the upper and lower rotary heads C and K turn together intermittently, causing the grippers F to pass successively underneath the discharge-opening $d$ of the feed-box and past the saw H and the bit I. The cam F' is so shaped that the grippers are opened just before reaching said discharge-opening and held open while passing the same and for a short distance beyond it and so that they are closed during the remainder of their cycle, as shown in Fig. 4. The operator pushes the ears in the feed-box toward its discharge-opening, and as an open gripper passes under the same the foremost ear in the box drops through the opening and between the jaws of the gripper and slides down the inclined table A, the stub of the ear passing through the opposing aperture $g'$ of the gage-rail $g$ and its butt resting against the inner side of said rail. Each of the succeeding grippers receives a single ear in like manner, and as the grippers approach the saw H they are automatically closed, thus tightly holding the ears and centering them in the grippers. The ears are now carried past the saw, which latter cuts off their stubs, leaving the central portion of the butt-ends straight. The gripper-carrying head C continues its onward movement until an ear arrives opposite the bit I, when it stops momentarily and the bit advances, boring a hole in the center of the butt and severing the husks, as hereinbefore described. The bit is thereupon retracted, and the rotary head C advances the proper distance to present the next ear to the bit, when the above operations are repeated, and so on throughout the remaining grippers of the series. Continuing their onward movement, the grippers are automatically opened on approaching the aperture $l$, leading to the husking-rollers below, and as the grippers pass over this aperture the released ears between their jaws fall through the aperture upon the corresponding pairs of husking-rollers, which latter remove the husks, as hereinbefore described. The husks and silks are discharged into the hopper N, whence they are removed and deposited at a suitable point by the fan R, while the husked ears on arriving opposite the spout $q$ slide through the latter upon the ground or into a suitable receptacle placed under the same.

It will be understood from the foregoing description that after the machine has been started all of the grippers are alternately receiving ears of corn and discharging them upon the husking-rollers and that the latter are at the same time operating upon the ears previously received from the grippers, so that a plurality of ears are undergoing the operations of cutting, boring, and husking at the same time.

By my improved construction and arrangement each gripper receives a single ear at a time, and hence but one ear is delivered to each pair of husking-rollers at a time. By this individual delivery of the ears to the husking-rollers each ear is effectually subjected to the action of the rollers without interference of other ears, thus insuring a thorough and complete husking of the same, while at the same time providing a machine of large capacity within a comparatively small compass.

By inclining the rotary head C toward its marginal gage-rail $g$ the ears slide down against said rail by gravity, thus dispensing with separate mechanical contrivances for this purpose and simplifying the machine, while the inclined arrangement of the husking-rollers likewise effects a gravity discharge of the husked ears, doing away with mechanically-operated discharge devices which complicate the construction of the machine and increase its cost.

I claim as my invention—

1. In a corn-husking machine, the combination of a husk-severing tool, a carrier having an ear-gripper arranged to traverse said tool, means for opening and closing the jaws of the gripper, and husking mechanism arranged to receive the ears from said gripper, substantially as set forth.

2. In a corn-husking machine, the combination of a husk-severing tool, a rotary head or carrier, a plurality of individual ear-grippers mounted on said head and arranged to traverse said tool, means for opening and closing the jaws of said grippers, and a plurality of individual husking devices arranged underneath said grippers, respectively, substantially as set forth.

3. In a corn-husking machine, the combination of a cutter for severing the stubs of the ears, a boring-bit or auger arranged beyond said cutter and adapted to penetrate the butts of the ears, a carrier having an ear-holder arranged to traverse said cutter and boring-bit, and actuating means for moving the carrier past the cutter and opposite the boring-bit, substantially as set forth.

4. In a corn-husking machine, the combination of a boring-bit or auger, a carrier having ear-holders arranged to traverse said bit, means for opening and closing said holders, and husking devices arranged to receive the ears from said holders, substantially as set forth.

5. In a corn-husking machine, the combination of a boring-bit or auger capable of longitudinal movement, means for reciprocating said bit, a carrier having ear-holders arranged to traverse said bit, driving mechanism for intermittently advancing said carrier, and husking devices arranged to receive the bored ears from said holders, substantially as set forth.

6. In a corn-husking machine, the combination of a cutter for severing the stubs of the ears, a boring-bit or auger arranged beyond said cutter and adapted to penetrate the butts of the ears for severing the husks from the cobs, a carrier having ear-holders arranged to traverse said cutter and said boring-bit successively, and driving mechanism for intermittently advancing the carrier, substantially as set forth.

7. In a corn-husking machine, the combination of a rotary head or carrier, ear-holders mounted on said head, a second rotary head or carrier arranged underneath the first-named head, and husking devices carried by said lower head and arranged to receive the ears from said holders, substantially as set forth.

8. In a corn-husking machine, the combination of a husk-severing tool, a rotary head carrying ear-holders which are arranged to traverse said tool, a second rotary head arranged underneath the first-named head, and individual pairs of husking-rollers carried by said lower head and arranged to receive the ears from said holders, respectively, substantially as set forth.

9. In a corn-husking machine, the combination of a husk-severing tool, a rotary head carrying individual ear-holders which are arranged to traverse said tool, a second rotary head or carrier arranged underneath the first-named head, connecting means for causing said heads to turn in unison, individual pairs of husking-rollers carried by said lower head and arranged opposite said ear-holders, respectively, and driving mechanism constructed to impart an intermittent rotary movement to said heads, substantially as set forth.

10. The combination of a feed-box having a discharge-opening, a rotary head or carrier arranged underneath said box and having radial ear-apertures arranged to register successively with said opening, individual ear-holders mounted on said carrier and arranged under said apertures, respectively, and husking devices arranged to receive the ears from said holders, substantially as set forth.

11. The combination of a feed-box having a discharge-opening, a rotary head or carrier arranged underneath said box and having radial ear-apertures arranged to register successively with said opening, individual ear-holders mounted on said carrier and arranged under said apertures, respectively, a second rotary head or carrier arranged underneath the first-named carrier, and individual pairs of husking-rollers arranged on said lower carrier opposite said ear-holders, respectively, substantially as set forth.

12. The combination of a stationary table provided with an ear-aperture, a husk-severing tool arranged at one side of said table, a rotary head located above the table and carrying a plurality of ear-holders which are arranged to traverse said tool, a second rotary head or carrier arranged underneath said table, and husking-rollers arranged on said lower head opposite said ear-holders, respectively, substantially as set forth.

13. In a corn-husking machine, the combination of ear-delivery devices, a carrier arranged underneath the same, inclined husking-rollers mounted on said carrier and arranged to receive the ears from said delivery devices, and a guard extending across the lower ends of the several rollers and provided with a spout or aperture through which the ears on said rollers are discharged by gravity upon arriving opposite the spout, substantially as set forth.

14. In a corn-husking machine, the combination of ear-delivery devices, a rotary conical head or carrier arranged underneath the same, a plurality of pairs of husking-rollers journaled radially on said carrier and sloping toward the periphery thereof, and an annular guard rim or curb extending across the lower ends of said rollers and provided with a spout or aperture for the discharge of the ears resting upon the rollers, substantially as set forth.

15. In a corn-husking machine, the combination of a stub-severing tool, a carrier having ear-holders arranged to traverse said tool, an inclined table arranged underneath said carrier and adapted to temporarily support the ears, and a gage-rail arranged at the lower edge of said carrier, opposite said ear-holders, and provided with apertures for the passage of the ear-stubs, substantially as set forth.

16. In a corn-husking machine, the combination of a rotary conical carrier provided at its periphery with a gage-rail having stub-apertures, individual ear-holders mounted radially on said conical carrier opposite said stub-apertures, a conical table arranged underneath said carrier, and a stub-severing tool arranged adjacent to said gage-rail, substantially as set forth.

17. In a corn-husking machine, the combination of a carrier, an ear holder or gripper comprising a pair of jaws pivoted to said carrier, a slide guided on the carrier, links connecting said jaws with said slide, and an actuating-cam engaged by said slide, substantially as set forth.

18. In a corn-husking machine, the combination of a rotary carrier, ear holders or grippers arranged radially on the same and each composed of a pair of jaw-arms pivoted to the carrier, a stationary cam arranged at the center of the carrier, actuating-slides for said jaw-arms arranged radially around said cam and engaging the same, and links connecting said slides with the corresponding jaw-arms, substantially as set forth.

19. In a corn-husking machine, the combination of a rotary carrier, ear holders or grippers arranged radially on the same and each composed of a pair of jaw-arms pivoted to the carrier, springs for opening said jaw-arms, a stationary cam arranged at the center of the carrier, actuating-slides for said jaw-arms arranged radially around said cam and engaging the same, and links connecting said slides with the corresponding jaw-arms, substantially as set forth.

20. In a corn-husking machine, the combination of a husk-severing tool, a rotary head carrying ear-holders arranged to traverse said tool, means for imparting an intermittent rotary motion to said head, husking-rollers arranged underneath said ear-holders, and means for driving said husking-rollers continuously, substantially as set forth.

21. In a corn-husking machine, the combination of a carrier, husking-rollers journaled thereon, means for driving said carrier and rollers, and a stationary ear-turning bed or surface arranged opposite the working sides of said rollers, substantially as set forth.

22. In a corn-husking machine, the combination of a rotary head or carrier, an annular series of husking-rollers journaled thereon, and a stationary annular brush arranged above said rollers and at the proper distance therefrom to bear upon the ears resting thereon, substantially as set forth.

23. In a corn-husking machine, the combination of a rotary head or carrier, an annular series of husking-rollers journaled thereon, a stationary annular brush which is arranged above said rollers and against which the ears are adapted to bear, and a comb or stripper mounted on said rotary head and arranged to traverse said brush, substantially as set forth.

24. The combination of a carrier, husking-rollers journaled thereon, an ear-turning brush arranged above said rollers, and stripping-teeth projecting from said carrier into the path of said brush and inclined in the direction of travel of the carrier, the carrier being provided on the rear side of said teeth with a silk-discharge aperture, substantially as set forth.

25. In a corn-husking machine, the combination of an ear-delivery device, a rotary head or carrier arranged underneath the same, husking-rollers journaled radially on said carrier, and an annular ear-turning brush arranged above said rollers and provided with a gap or aperture through which the ears are permitted to drop from said ear-delivery devices to the husking-rollers below, substantially as set forth.

26. In a corn-husking machine, the combination of a housing, a pair of husking-rollers journaled therein, one of the rollers being provided with annular grooves which are unobstructed at the opposing sides of the rollers, means for closing said grooves at the opposite side of the grooved roller, and an air-exhaust device connected with said housing below said rollers, substantially as set forth.

Witness my hand this 17th day of April, 1902.

FRED C. IELFIELD.

Witnesses:
JNO. S. KNOX,
ROYAL P. WARD.